UNITED STATES PATENT OFFICE.

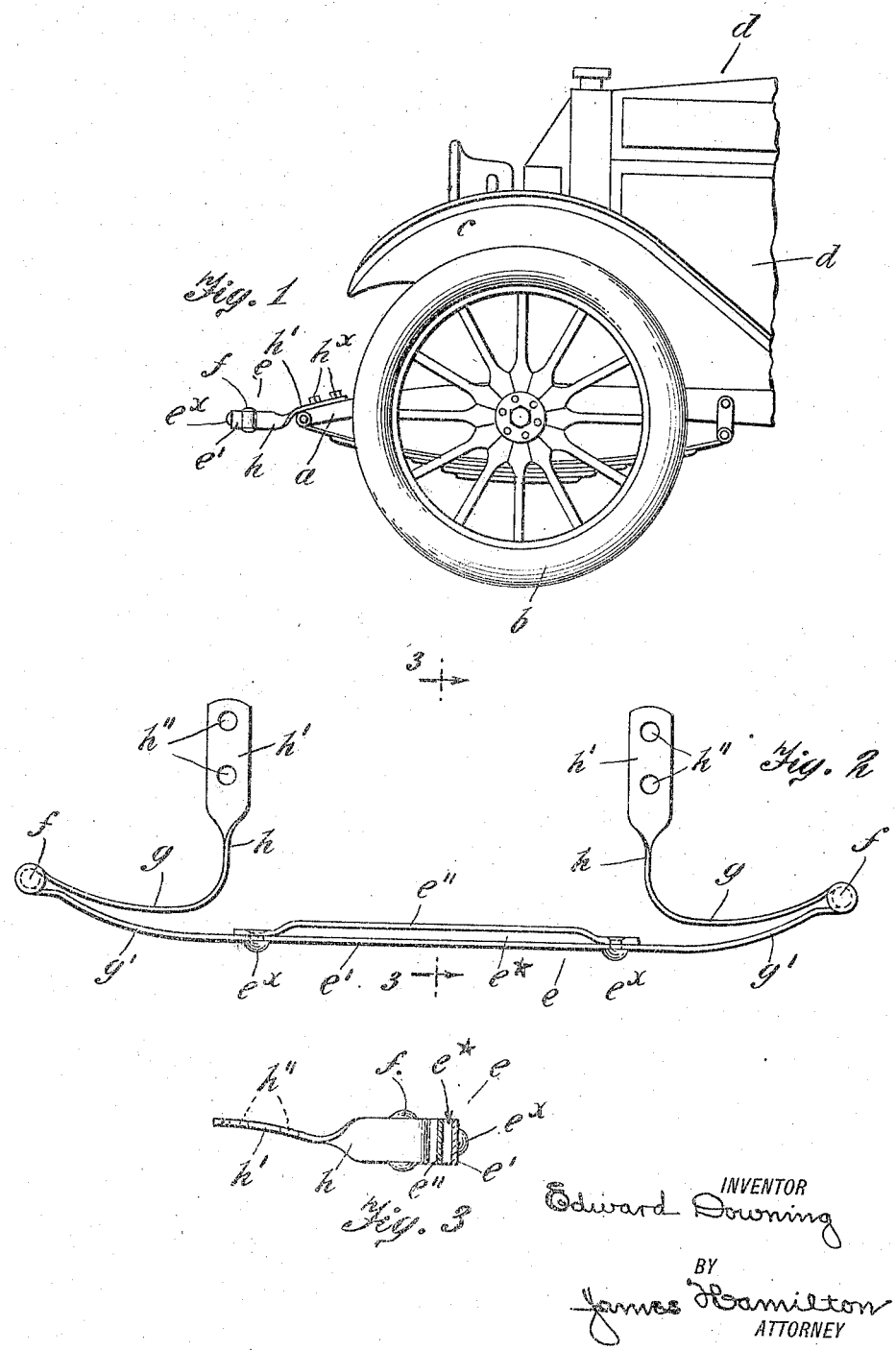

EDWARD DOWNING, OF SAN FRANCISCO, CALIFORNIA.

AUTOMOBILE-BUMPER.

1,303,267.

Specification of Letters Patent.    Patented May 13, 1919.

Application filed December 17, 1917. Serial No. 207,394.

*To all whom it may concern:*

Be it known that I, EDWARD DOWNING, a citizen of the United States of America, residing at San Francisco, in the county of San Francisco and State of California, have invented certain new and useful Improvements in Automobile-Bumpers, of which the following is a specification, reference being had to the accompanying drawings, forming a part thereof.

This invention relates to improvements in bumpers for automobiles and particularly to bumpers of the general type of which an example is described and shown in the United States patent granted Thomas A. Hoover July 18, 1916, No. 1,191,306; and an object of this invention is to provide an automobile bumper that will protect the car well in an accident and generally act efficiently during collision operation. Another object of this invention is to provide a bumper of the kind just referred to which will be simple in construction, comparatively cheap in manufacture, and durable and satisfactory in use and operation.

In the drawings illustrating the principle of this invention and the best mode now known to me of applying that principle, Figure 1 is a side view of the front end of an automobile equipped with my new bumper; Fig. 2 is a plan of the bumper detached; and Fig. 3 is a section on the line 3—3, of Fig. 2.

$a$ denotes the chassis, $b$ a front wheel and $c$ one of the mud-guards of the automobile $d$. The bumper $e$ is formed from a single bar of spring metal, which is, at the ends of the bumper, curved rearwardly slightly and bent around pins $f$, the ends of the bar being directed, first, inwardly toward each other to form branches $g$ spaced from but almost parallel to the main part $e'$ of the bumper, and, secondly, rearwardly to form a pair of arms $h$ parallel to each other and having flattened ends $h'$ formed with bolt-holes $h''$ for the reception of bolts $h^x$ (Fig. 1) by means of which the bumper $e$ is fastened to the chassis $a$ of the car. The parts thus far mentioned are all shown and described in the Hoover patent above referred to.

As is shown at $g'$, Figs. 2 and 4, of the latter patent, a strip of metal is fastened to the main bar of the Hoover bumper for the purpose of reinforcing the same at that portion thereof that is most likely to come into play during a collision. Heretofore this strip (marked $g'$ in the Hoover patent) has been made of soft steel and has been fastened to the front face of the main bar; and it has been found by experience that, when this strip of soft steel is bent by the impact of the bumper against an obstruction or against another bumper (*e. g.*, of an automobile moving in the opposite direction), the strip takes a set due to the fact that its elastic limit and resiliency are comparatively low or slight, and, being in front of the main or impact-receiving part of the bumper, the strip, when so bent and set, prevents the latter part of the bumper from springing back into place and cushioning the shock of impact. In the bumper $e$ herein shown and described, there is provided a strip $e''$ of spring steel that is fastened (*e. g.*, by the rivets $e^x$) to the rear face of the main part or collision bar $e'$ of the bumper $e$ and that is preferably spaced from the latter, as is clearly shown in Fig. 2 at $e^*$. Obviously the collision bar $e'$ is that part of the bumper $e$ which first receives the impact or blow in time of collision. In collision operation, the main part $e'$ of the bumper bends back, until it bears against the highly elastic, spring-steel reinforcing strip $e''$, which thereupon takes up the thrust and supports and strengthens the main bar $e'$; and, after the point of maximum deformation for that particular instance or collision has been reached, the great resiliency of the spring steel of the strip $e''$ acts to press forwardly and restore to its normal shape the main bar $e'$. Furthermore, during the impact of the collision, the branches $g$ bear against and support the curved ends $g'$ of the main bar $e'$.

In view of the provision of the spring-steel reinforcing-bar $e''$, the main bar $e'$ may be made of metal having substantially uniform strength throughout, whereby there is avoided the use of a bar that is stronger at some particular point and which has a tendency to break at the weaker part of the bar upon which the burden of the stress is shown by the stronger part. This is an important feature of this invention and an important advantage gained by the use of a main bar of substantially uniform strength throughout over a bar that is stronger at one part than it is at another.

I claim:

1. A bumper of the character described, including a collision bar; and a reinforcing bar therefor carried thereby in rear thereof, and differing therefrom in physical characteristics and qualities, said reinforcing bar being of spring material and having a substantially greater resiliency and elasticity than the collision bar that carries said reinforcing bar, whereby the latter aids the collision bar in recovering its original shape after deformation.

2. A bumper of the character described, including a collision bar; and a reinforcing bar therefor carried thereby in rear thereof and being spaced therefrom, and differing in physical characteristics and qualities from said collision bar; said reinforcing bar being of spring materal and having a substantially greater resiliency and elasticity than the collision bar that carries said reinforcing bar, whereby the latter aids the collision bar in recovering its original shape after deformation.

3. A bumper of the character described, including a collision bar; and a reinforcing bar therefor carried thereby in rear thereof and spaced therefrom sufficiently to allow the collision bar to absorb light collision shocks substantially unaided by the reinforcing bar and to insure that the reinforcing bar shares in the absorption of severe collision shocks with the collision bar; both said bars being of spring metal and capable of yielding under stress and of resuming their initial shape after the stress is removed, but the reinforcing bar having a substantially higher elastic limit and greater resiliency than has the collision bar and being arranged to aid the same in recovering its original shape after deformation.

4. A bumper of the character described, including a collision bar that is of substantially uniform strength throughout its active length; and a reinforcing bar carried thereby in rear thereof and having greater resiliency and a higher elastic limit than has the collision bar by which it is carried.

Signed at San Francisco, California, this 5th day of December, A. D. 1917, in the presence of the two undersigned witnesses.

EDWARD DOWNING.

Witnesses:
  B. WILSON,
  ROY O. BROOKS.